United States Patent [19]

Schwierz

[11] 4,286,267

[45] Aug. 25, 1981

[54] DIRECTIONAL ANTENNA SYSTEM WITH ELECTRONICALLY CONTROLLABLE SWEEP OF THE BEAM DIRECTION

[75] Inventor: Theodor Schwierz, Klingen, Fed. Rep. of Germany

[73] Assignee: Siemens Aktiengesellschaft, Berlin & Munich, Fed. Rep. of Germany

[21] Appl. No.: 23,308

[22] Filed: Mar. 23, 1979

[30] Foreign Application Priority Data

Mar. 31, 1978 [DE] Fed. Rep. of Germany ....... 2813916

[51] Int. Cl.[3] ............................................ H04B 7/00

[52] U.S. Cl. ................................ 343/100 SA; 343/854

[58] Field of Search .......................... 343/100 SA, 854

[56] References Cited

U.S. PATENT DOCUMENTS 3,276,018 9/1966 Butler .

3,534,365 10/1970 Korvin et al. .

3,541,565 11/1970 Zisler ............................ 343/100 SA 3,569,976 3/1971 Korvin et al. .

3,806,932 4/1974 Dietrich et al. ............... 343/100 SA

FOREIGN PATENT DOCUMENTS 1416364 12/1975 United Kingdom .

OTHER PUBLICATIONS

*Ultra-Low Sidelobes From Time-Modulated Arrays,* IEEE Transactions on Antennas & Propagation, pp. 633-637.

*Radar Handbook,* M. Skolnik, 1970, McGraw-Hill Book Co., pp. 6 & 7, Chapter 11.

*Step-Scanned Circular-Array Antenna,* IEEE Transactions on Antennas & Propagation, vol. AP-18, No. 5, Sep. 70, pp. 590-595.

*Contributions,* IEEE Transactions on Antennas and Propagation, vol. AP-14, No. 3, May 66, pp. 260-266.

*Primary Examiner*—Theodore M. Blum

*Attorney, Agent, or Firm*—Hill, Van Santen, Steadman, Chiara & Simpson

[57] ABSTRACT

A directional antenna system with electronically controllable sweep of the beam comprising a radiator arrangement facing toward a reflector and including a switching and control apparatus connected to the radiator and in which very rapid sweeps of the beam direction can be accomplished with high precision and utilizing a large plurality of individual radiators arranged in a matrix with rows and columns and wherein the control and switching apparatus selectively actuates particular ones of the individual radiators such that switching between different groups of radiators causes a change in the beam direction due to the spatial change in position relative to the primary radiator.

7 Claims, 5 Drawing Figures

| SQ | 1,2,5,6 | 2,3,6,7 | 3,4,7,8 | 5,6,9,10 | 6,7,10,11 | 7,8,11,12 | 9,10,13,14 | 10,11,14,15 | 11,12,15,16 |
|---|---|---|---|---|---|---|---|---|---|
| a | 0 | L | L | 0 | L | L | 0 | L | L |
| b | 0 | 0 | 0 | L | L | L | L | L | L |
| c | L | L | L | L | L | L | 0 | 0 | 0 |
| d | L | L | 0 | L | L | 0 | L | L | 0 |

DIRECTIONAL ANTENNA SYSTEM WITH ELECTRONICALLY CONTROLLABLE SWEEP OF THE BEAM DIRECTION

BACKGROUND OF THE INVENTION

1. Field of the Invention

This invention relates in general to directional antenna systems using electronically controllable sweep of the beam.

2. Description of the Prior Art

Directional antenna systems with controllable beam direction, for example, in radar technology for purposes of target tracking and in satellite communication transmission systems for alignment of an on-board antenna of a space missile so as to align it to a remote station on the ground as well as for communication transmission via tropo-scatter arrangements are known. In principle, there is the possibility of producing a sweep of the beam of the directional antenna with mechanical means which sweeps the antenna or by mechanically displacement of the primary radiator with respect to the reflector. However, as a practical matter, such mechanical solutions are not feasible when relatively high speed of shifting from one beam direction to another are required. In tropo-scatter applications, for example, in which brief fading of signals occur, it is necessary to change the direction of the beam within one to three $\mu$ seconds so as to maintain error free operation. As described in the publication Merrill Skolnik, *Radar Handbook*, McGraw-Hill Book Company, New York, 1970, Chapter 11, Pages 6 and 7 there are a number of possibilities of producing a sweep of the beam direction utilizing electronic techniques by means of a radiator arrangement consisting of a plurality of radiators. In the final analysis, all of these various possibilities operate by influencing the direction by means of a feed of the radiator elements of the radiator field which varies in phase with the phase front of the resultant electromagnetic wave and this results in a change of the beam direction.

The publication Leon J. Ricardi entitled *Multibeam Antennas Communication Satellite Antenna Technology Seminar*, Boston University, Oct. 31 through Nov. 4, 1977, discusses electronically steering the beam direction of a directional antenna by means of changing the position of the primary radiator arrangement by utilizing different primary radiators of the primary radiator arrangement which are activated as a function of the desired beam direction. Difficulties exist with regard to the realization of the wiring and switching system for the various primary radiators in this technique. This is particularly true in the case where two or more primary radiators must respectively cooperate for the desired beam formation to sweep the antenna beam in its direction.

SUMMARY OF THE INVENTION

It is an object of the present invention to provide a directional antenna system with electronically controllable sweep of the beam direction with a prescribed beam shape and high precision for adjustment of the direction of the beam and which can be accomplished with a simple construction of the wiring and switching arrangement for the primary radiator.

The object of the invention is achieved in that the radiator arrangement consists of $n \times m$ where n and m are positive whole numbers of matrix-like arranged radiator elements wherein in this radiator field radiator groups of $k \times l$ wherein k and l are whole positive numbers with matrix-like arranged radiator elements are selectively activated with $(n-k+1)\times(m-l+1)$ selection possibilities. In the invention, a line branching arrangement is provided which divides or sums the total energy almost without loss into $k \times l$ branches which receive nearly equal shares of energy and wherein the branches are formed into star-shaped constructed switching branches. Sij—for $1 \leqq i \leqq k$ and $1 \leqq j \leqq l$ and wherein the switching branches respectively provide $(1+\text{Int.}|n-1|/k)\times(1+\text{Int.}|m-j|/1)$ line arms which connect to the radiator elements with the switching elements inserted therein and actuatable with a control circuit. The control circuit for the actuation of a selectable group of $k \times l$ number of radiator elements in each switching branch always switches only one of the switching elements normally in the off-state into the on-state. A particularly favorable construction arrangement is produced when the switching branches respectively assume a central position relative to the radiator elements and are connected to their line arms in a plane behind the radiator elements of the radiator field and are arranged in a plane.

In the invention, particular significance and improvement results when the division or the summation of the total energy by way of the line branching and the switching branches with their line arms is accomplished so that signals are fed in equal phase to the radiator elements.

Other objects, features and advantages of the invention will be readily apparent from the following description of certain preferred embodiments thereof, taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
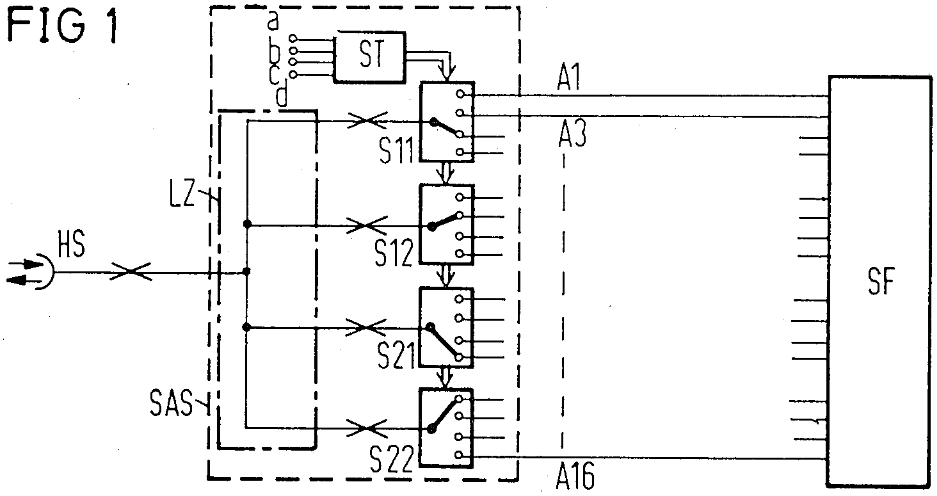
FIG. 1 comprises a block schematic illustration of a switching and control installation for the beam of a directional antenna system.

FIG. 1 illustrates the switching and control installation SAS which includes the switching branches S11, S12, S21 and S22 which are switched by the control circuit ST which receives the control inputs a, b, c and d. The line branching arrangement LZ is connected to the switching arms of the switching branches S11, S12, S21 and S22 and during transmission, for example, the total energy arriving is divided at the main connection HS to the switching branches in equal parts and in equal phase. During reception, the energy arriving by way of the switching branches are summed so as to be in equal phase and are supplied to the main connection HS. The radiator field SF comprises sixteen radiator elements arranged in matrix shaped form and there is a connection for each separate radiator element. These sixteen connections of the radiator field SF are connected with the switching branches S11, S11, S21, S22 each of which respectively have four output feed line or arms A1, A2 . . . A16.

Figure 2:
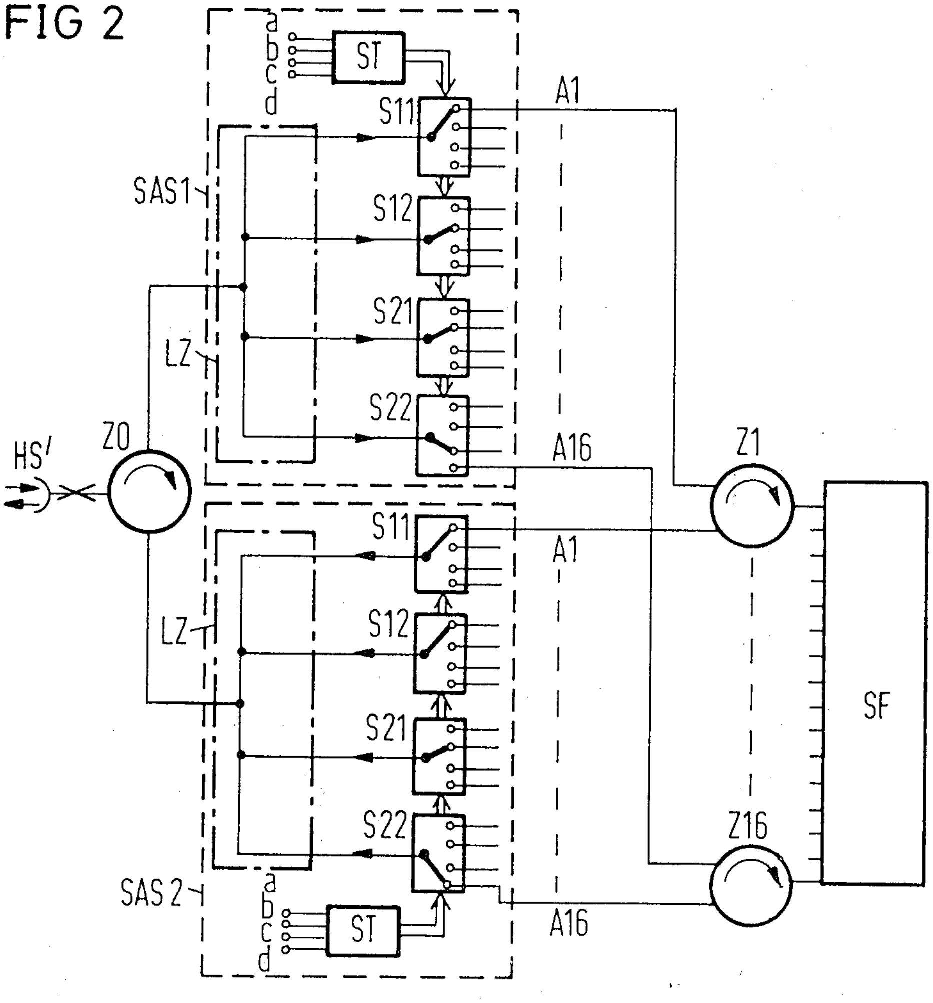
FIG. 2 is a block schematic illustration of two switching and control installations for the beam of a directional antenna system for independent control during transmitting and receiving.

In the event it is desired to provide different directions for the antenna beam during transmission or reception independently of the function of the antenna, the arrangement illustrated in FIG. 2 can be utilized for separate switching and control of control installations SAS1 and SAS2 which are respectively provided for reception and transmission. Each of the switching and control installation have sixteen line legs A1, A2 . . . A16 and the leg A1 from switching control installation SAS1 is connected to the radiator field SF by way of a circulator Z1. Also, each of the other legs A2 . . . A16 are respectively connected to the radiator field SF by way of circulators Z2 through Z16. The main connections HS of the two line branching circuits LZ of the two switching and control installations SAS1 and SAS2 are connected to the common main connection HS' by way of a circulator ZO.

Figure 3:
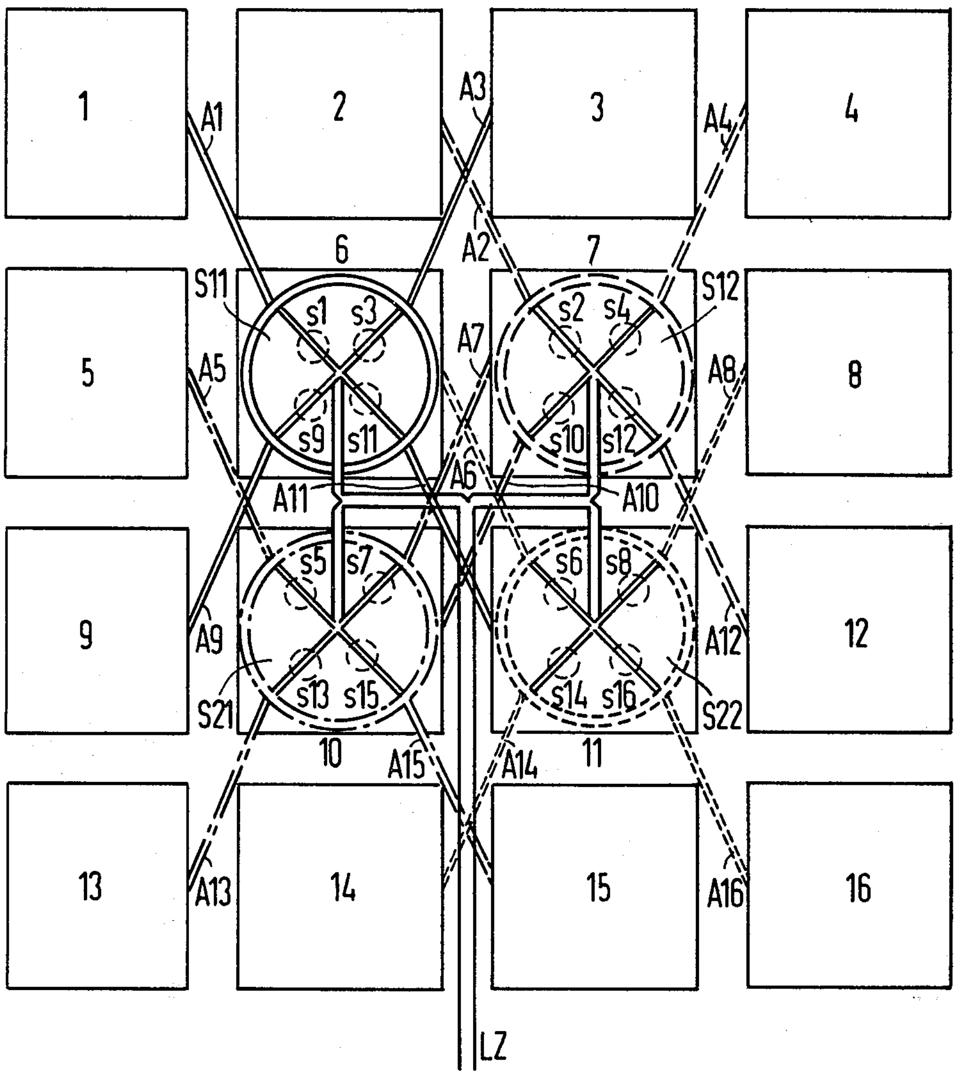
FIG. 3 is an illustration of a beam antenna with switching and control installation in greater detail.

FIG. 3 is a plan view illustrating a sample embodiment for the radiator field SF with the switching branches S11, S12, S21 and S22 illustrated in greater detail. The radiator field SF is formed as a quadratic configuration in which the sixteen radiator elements 1 through 16 are in the form of waveguide radiators arranged in a matrix with four rows and four columns. The radiators may be mounted relative to a parabolic reflector, for example, such that when different groups of the radiators are energized, the directional beam of the antenna can be varied. Each of the four switching branches S11, S12, S21 and S22 have four respective line arms or legs arranged behind the radiator field in a central position. For the radiator elements a matrix-like arrangement exists for the switching branches which correspond to the matrix-like arrangement of the radiators 6, 7, 10 and 11. Each of the switching branches is connected at its connection point with a line of the branching LZ and a PIN-diode switch s1, s2 . . . s16 is mounted in each of the line branches A1, A2 . . . A16. The PIN-diode switches are controlled by the control circuit ST as shown in FIGS. 1 and 2. When in their off-state the PIN-diode switches block the line, arm or legs in which they are mounted and thus signals cannot pass to the radiator elements with which the particular leg is associated. When the diode switches are turned on depending on the selection of a particular radiator group which it is desired to energize each time only one of the four PIN-diode switches associated with a switching branch is transferred from the off-state to the on-state. Each of the radiator groups consist of four radiator elements arranged with four antennas adjacent each other in a square. For example, in the sample embodiment illustrated in FIGS. 1 and 3 there are nine selection possibilities available. The PIN-diode switches are arranged in a manner such that they produce an extreme mismatch at the crossing point of the line legs when in the off-state. In this fashion, it is assured that the energy portions present at the crossing points are practically without loss either coupled into the line branching element or transmitted to the radiator element.

Figures 4, 5:
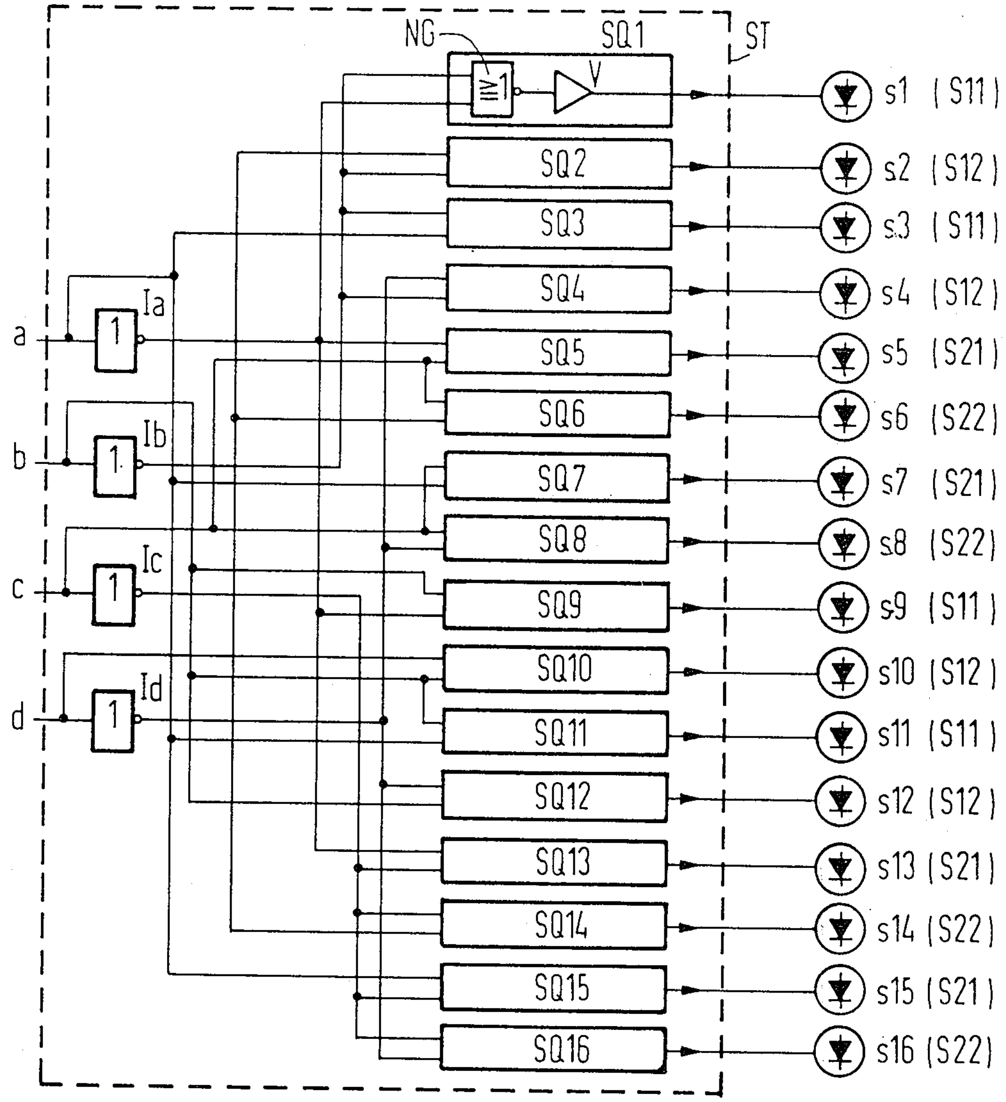
FIG. 4 is a block circuit diagram from the control installation of the switching and control installation illustrated in FIG. 1.
FIG. 5 comprises a table for explaining the control installation shown in FIG. 4.

For each of the PIN-diode switches s1, s2 . . . s16 the control circuit ST illustrated in FIG. 4 provides a control source SQ1, SQ2 . . . SQ16. Each of the control sources SQ1 through 16 include two inputs that are supplied to a NAND-gate NG which are connected to the control points a, b, c and d for digital control signal through a line network. The line network includes the inverters $I_a$, $I_b$, $I_c$ and $I_d$ connected as shown in FIG. 4. Each of the control source circuits SQ include amplifiers V after the NAND-gate NG and the output of the respective amplifiers corresponds to the output of the control source SQ. The PIN-diode switch associated with each of the switching branches S11, S12, S21 and S22 are illustrated in FIG. 4 adjacent the associated switching branch.

The table in FIG. 5 illustrates the manner in which the control circuit ST can be digitally controlled by way of the inputs a, b, c and d. The columns respectively indicate which digital combination of the control sources SQ1, SQ2 . . . SQ16 is switched off at the inputs a, b, c and d. When the control current is turned off, the respective PIN-diode switch will be in the on-state and the PIN-diode switch will be in the off-state when the control current at the output of the control sources SQ are turned on. Since the numbers associated with the designations of the PIN-diode switches s1, s2 . . . s16 are identical to the numbers associated with the radiator elements 1, 2 . . . 16, the top line in the table illustrated in FIG. 5 indicates which radiator group within the radiator field SF will be activated at a particular time.

In the sample embodimenmt according to FIGS. 1, 3 and 4, the switching branches S11, S12, S21 and S22 respectively have the same number of line arms or legs A1, A2 . . . A16. It is to be realized, of course, that the invention is not limited to such arrangement. Generally, configurations are also possible in which at least a part of the switching branches have a different number of line legs relative to the remaining switching branches. This would be particularly true if one varies from the quadratic configuration of the matrix-like radiator elements.

Thus, in the invention, to energize the radiator elements 1, 2, 5 and 6 in FIG. 3, the control signals a and b will have a first state or zero and the control signals at terminals c and d will have a second state or L. This turns on radiator elements 1, 2, 5 and 6 as illustrated in FIG. 5. On the other hand, in order to turn on radiator elements 11, 12, 15 and 16, the control signal at terminals a and b must be in state L whereas the signal at control terminals c and d must be in the zero condition. As shown by FIG. 5, the nine different combinations of four radiator elements may be selected by varying the control signals at terminals a, b, c and d from either zero or the L condition.

It is seen that this invention has been described with respect to preferred embodiments, although it is not to be so limited as changes and modifications may be made therein which are within the full intended scope of the invention as defined by the appended claims.

I claim:

1. A directional antenna system with electronically controllable beam sweep consisting of a radiator arrangement oriented toward a reflector and of a switching and control installation associated with the radiator arrangement, characterized in that the radiator arrangement consists of $n \times m$ (whole positive numbers for n and m) radiator elements (1, 2 . . . 16) arranged matrix-like oriented toward said reflector, and in this radiator field (SF), radiator groups of respectively $k \times l$ (whole positive numbers for k and l) with matrix-like arranged radiator elements are activatable with (n−k+1)×(m−l+1) elements, a line branching (LZ) is provided which divides or, respectively, sums up the total energy substantially without loss in k×branches with nearly equal portions of energy and the branches are formed into star-shaped switching branches Sij (S11, S12, S21, S22)—for 1=i=k and 1=j=l, and the switching branches respectively have (1+Int.-n−i/k)×(1+Int.m−j/l) line legs (A1, A2 . . . A16) connected to said radiator elements and switching elements (s1, s2 . . . s16) inserted into each leg and actuatable by a control circuit (ST), and the control circuit for the activation of a selectable group of k×l radiator elements always switches only one of the switching elements in each switching branch which are normally in the off-state to the on-state to turn on various combinations to and from said radiator elements to control the directivity of said reflector.

2. A directional antenna system according to claim 1, characterized in that the switching branches (S11, S12, S21, S22) are mounted in a central position with regard to the radiator elements connected to their line legs (A1, A2 . . . A16) in a plane behind the radiator elements of the radiator field (SF) which are mounted in a plane.

3. A directional antenna system according to claim 2, characterized in that the division or, respectively, summing up of the total energy to the line branching (LZ) and the switching branches (S11, S12, S21, S22) with their line legs (A1, A2 . . . A16) is accomplished with the energy in equal phase from all radiator elements (1, 2 . . . 16).

4. A directional antenna system according to claim 3, characterized in that the switching elements (s1, s2 . . . s16) are PIN-diode switches mounted, for example, in coaxial fashion.

5. A directional antenna system according to claim 4, characterized in that the switching elements (s1, s2 . . . s16) in the line legs (A1, A2 . . . A16) of a switching branch (S11, S12, S21, S22) in the off-state represent an extreme mismatch of the associated line leg at the connection point of the switching elements in the frequency range being used.

6. A directional antenna system with electronically controllable beam sweep consisting of a radiator arrangement oriented toward a reflector and of a switching and control installation associated with the radiator arrangement, characterized in that the radiator arrangement consists of n×m (whole positive numbers for n and m) radiator elements (1, 2 . . . 16) arranged matrix-like oriented toward said reflector, and in this radiator field (SF), radiator groups of respectively k×l (whole positive numbers for k and l) with matrix-like arranged radiator elements are activatable with (n−k+1)×(m−+1) elements, a line branching (LZ) is provided which divides or, respectively, sums up the total energy substantially without loss in k×branches with nearly equal portions of energy and the branches are formed into star-shaped switching branches Sij (S11, S12, S21, S22)—for 1=i=k and 1=j=, and the switching branches respectively have (1+Int.-n−i/k)×(1+Int.m−j/l) line legs (A1, A2 . . . A16) connected to said radiator elements and switching elements (s1, s2 . . . s16) inserted into each leg and actuatable by a control circuit (ST), and the control circuit for the activation of a selectable group of k×radiator elements always switches only one of the switching elements in each switching branch which are normally in the off-state to the on-state to turn on various combinations to and from said radiator elements to control the directivity of said reflector, said switching branches (S11, S12, S21, S22) being mounted in a central position with regard to the radiator elements connected to their line legs (A1, A2 . . . A16) in a plane behind the radiator elements of the radiator field (SF) which are mounted in a plane, wherein the division or, respectively, summing up of the total energy to the line branching (LZ) and the switching branches (S11, S12, S21, S22) with their line legs (A1, A2 . . . A16) is accomplished with the energy in equal phase from all radiator elements (1, 2 . . . 16), wherein the switching elements (s1, s2 . . . s16) are PIN-diode switches mounted, for example, in coaxial fashion, wherein the switching elements (s1, s2 . . . s16) in the line legs (A1, A2 . . . A16) of a switching branch (S11, S12, S21, S22) in the off-state represent an extreme mismatch of the associated line leg at the connection point of the switching elements in the frequency range being used, and wherein the radiator field (SF) has two switching and control installations (SAS1, SAS2) for transmission and reception which are independent of one another, and in that the line legs (A1, A2 . . . A16) of the switching branches (S11, S12, S21, S22) of both switching and control installations associated with the radiator elements (1, 2 . . . 16) of the radiator field are connected to the radiator elements by way of circulators (Z1 . . . Z16).

7. A directional antenna system according to claim 6, characterized in that the line branchings (LZ) of both switching and control installations (SAS1, SAS2) are connected to a common main connection (HS') by way of a circulator (ZO).

* * * * *